(12) United States Patent
Cravey

(10) Patent No.: US 7,906,980 B1
(45) Date of Patent: Mar. 15, 2011

(54) RAPID SWEEPING LOAD TESTING CIRCUIT AND METHOD

(76) Inventor: William Ray Cravey, Albuquerque, NM (US)

( * ) Notice: Subject to any disclaimer, the term of this patent is extended or adjusted under 35 U.S.C. 154(b) by 147 days.

(21) Appl. No.: 12/389,302

(22) Filed: Feb. 19, 2009

Related U.S. Application Data

(60) Provisional application No. 61/029,789, filed on Feb. 19, 2008.

(51) Int. Cl.
*G01R 31/26* (2006.01)
(52) U.S. Cl. .................................. 324/761.01
(58) Field of Classification Search .......... None
See application file for complete search history.

(56) References Cited

U.S. PATENT DOCUMENTS

| | | | | | |
|---|---|---|---|---|---|
| 3,230,452 | A | * | 1/1966 | Angello | 324/771 |
| 4,163,194 | A | * | 7/1979 | Ross | 324/767 |
| 4,456,880 | A | * | 6/1984 | Warner et al. | 324/767 |
| 4,794,272 | A | * | 12/1988 | Bavaro et al. | 307/66 |
| 6,876,187 | B2 | * | 4/2005 | Matsuyama | 324/96 |
| 7,554,346 | B2 | * | 6/2009 | Kluth et al. | 324/750 |

* cited by examiner

*Primary Examiner* — Vinh P Nguyen
(74) *Attorney, Agent, or Firm* — Justin R. Jackson; Philip D. Askenazy; Peacock Myers, P.C.

(57) ABSTRACT

A circuit and method that provides an inexpensive and easily implemented rapidly-changing load test circuit for photovoltaic cells, which can be under pulsed light conditions. Embodiments of the present invention permit the testing of photovoltaic cells by causing a sweeping voltage across the photovoltaic cell in a very short time period.

22 Claims, 5 Drawing Sheets

RAPID SWEEPING LOAD TESTING CIRCUIT AND METHOD

CROSS-REFERENCE TO RELATED APPLICATIONS

This application claims priority to and the benefit of the filing of U.S. Provisional Patent Application Ser. No. 61/029,789, entitled "Rapid Photovoltaic Cell Tester", filed on Feb. 19, 2008, and the specification thereof is incorporated herein by reference.

BACKGROUND OF THE INVENTION

1. Field of the Invention (Technical Field)

Embodiments of the present invention relate to a circuit for providing a rapidly sweeping load, which can be used in numerous applications, particularly for use in testing a photovoltaic cell.

2. Description of Related Art

Testing of PV cells under pulsed conditions requires the voltage of the cell to be swept over a range of greater than the open circuit voltage to a negative bias or vice versa. Although numerous manners and circuits are known for testing photovoltaic cells, particularly in an attempt to maintain consistent quality controls for the manufacturer thereof, known systems cannot meet the high speed timing requirements to sweep the load in less than about three milliseconds. Accordingly, known systems do not have the ability provide a sufficiently rapidly changing test load so that changing load tests can be easily and inexpensively incorporated into large-scale photovoltaic cell manufacturing facilities. There is thus a present need for a method and apparatus which provides an inexpensive and easily implemented rapidly-changing load test for photovoltaic cells. Embodiments of the present invention are able to sweep a load within a time of about 10 milliseconds to about 10 microseconds. This allows for testing of PV cells in much faster time frames than currently available.

BRIEF SUMMARY OF THE INVENTION

An embodiment of the present invention relates to a circuit for providing a rapid sweeping load which includes first and second power supplies; a first capacitor coupled in a parallel configuration to the first power supply; a second capacitor coupled in a parallel configuration to the second power supply; a first current limiting component connecting the first power supply to the first capacitor; a second current limiting component connecting the second power supply to the second capacitor; third capacitor comprising a capacitance substantially smaller than each of the first and the second capacitors; and first and second switches respectively coupling the first and second capacitors to the third capacitor.

In one embodiment, at least one of the switches is a solid state switch and more preferably, both of the switches are solid state switches. In one embodiment at least one of the first or second capacitors has a capacitance of less than about 10 millifarads and/or less than about 5 millifarads. Optionally, the third capacitor can have a capacitance which is greater than that of the first or second capacitors. In addition, the circuit can also have a third current limiting component and the third current limiting component can include a current limiting resistor and/or an inductor. In one embodiment, the first and second capacitors can be replaced with first and second inductors. The third current limiting component can be electrically connected between the load capacitor and the first and second charged capacitors.

An embodiment of the present invention also relates to a method for testing a photovoltaic cell which includes connecting the photovoltaic cell to a testing circuit; connecting a load capacitor to a first charged capacitor; disconnecting the load capacitor from the first capacitor; connecting the load capacitor to a second charged capacitor; applying a light source to the photovoltaic cell; and obtaining one or more measurements. The method can also include disconnecting the load capacitor from the second charged capacitor. Applying a light source can include applying a pulsed light source. The one or more measurements obtained can include a voltage measurement and/or a current measurement. In the method disconnecting the load capacitor from the first capacitor and connecting the load capacitor to a second charged capacitor preferably causes a sweeping voltage across the photovoltaic cell.

In one embodiment, the one or more measurements can be obtained during the time in which the sweeping voltage across the photovoltaic cell occurs. The measurements are preferably obtained during a time period of from about 10 microseconds to about 100 milliseconds and/or about 10 microseconds to about 10 milliseconds.

Embodiments of the present invention include but are not limited to methods where a photovoltaic cell connects to a photovoltaic cell in a parallel configuration with a load capacitor. Connecting with a load capacitor to a first charged capacitor includes but is not limited to connecting a load capacitor to a first charged capacitor which has substantially larger capacitance than the load capacitor. And connecting a load capacitor to a first charged capacitor includes but is not limited to connecting a load capacitor to a second charged capacitor which has larger capacitance than the load capacitor.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Embodiments of the present invention are directed to circuits and methods for rapidly testing photovoltaic cells at various loads.

An embodiment of the present invention relates to a high speed load. Although those skilled in the art will readily recognize numerous uses for such a load, the invention of the present invention is particularly useful for testing photovoltaic (PV) cells and loads under pulsed conditions. The load consists of 2 or more high speed switches and capacitors arranged to allow a voltage sweep across the cell in time frames ranging from about 10's of microseconds to about 10's of milliseconds. The voltage sweep can range from millivolts to several kilovolts and photovoltaic currents from about a few milliamps to about several kiloamps. In addition, the load can sweep between 2 or more load points, positive and/or negative, either high to low or low to high or any combination thereof. The same circuit configuration can be used for a load which can consist of more than 2 load points up to any number desired, simply by providing additional branches to the circuit.

Figure 1:
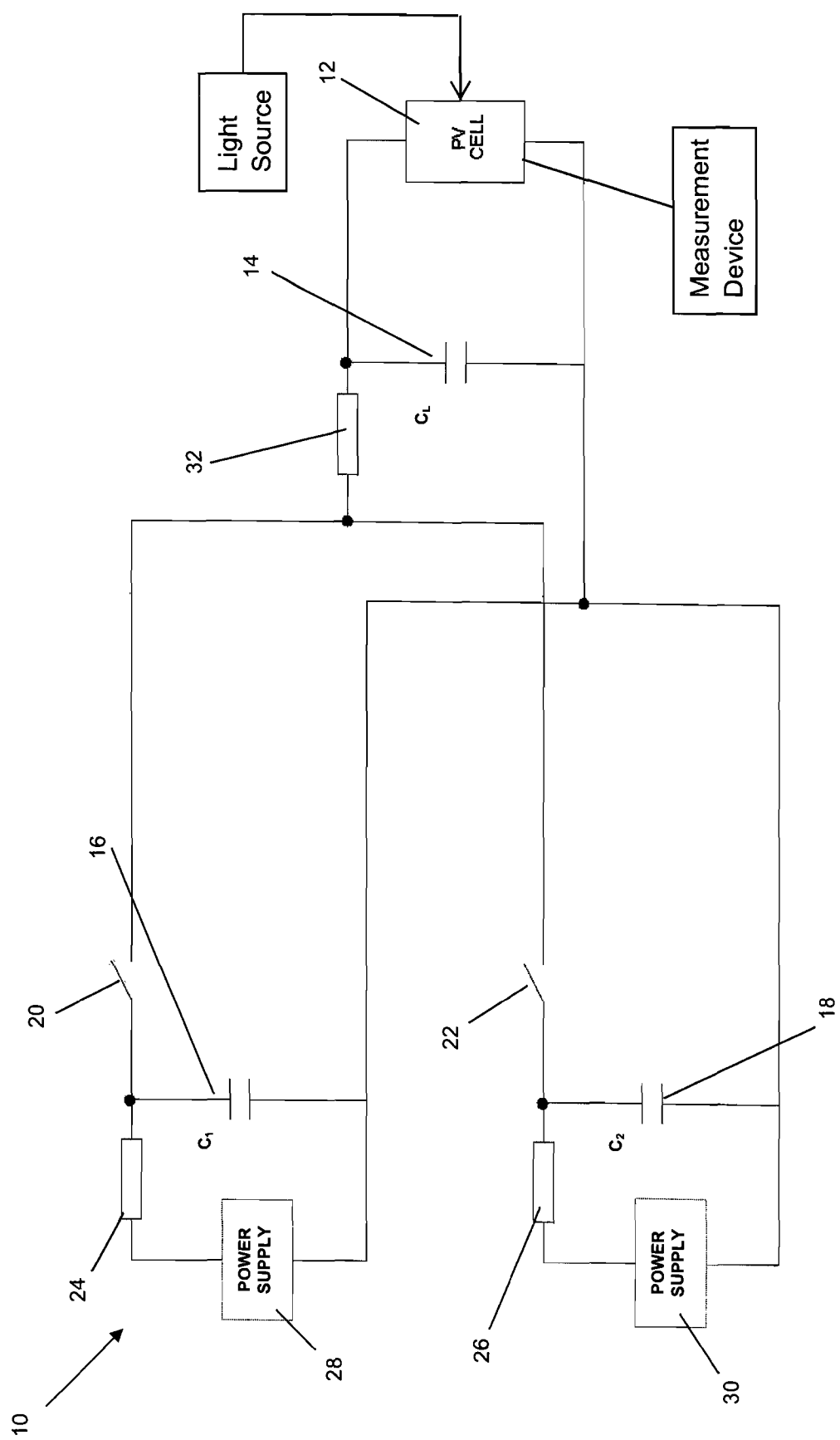
FIG. 1 is a drawing illustrating a circuit according to an embodiment of the present invention.
Figure 2:
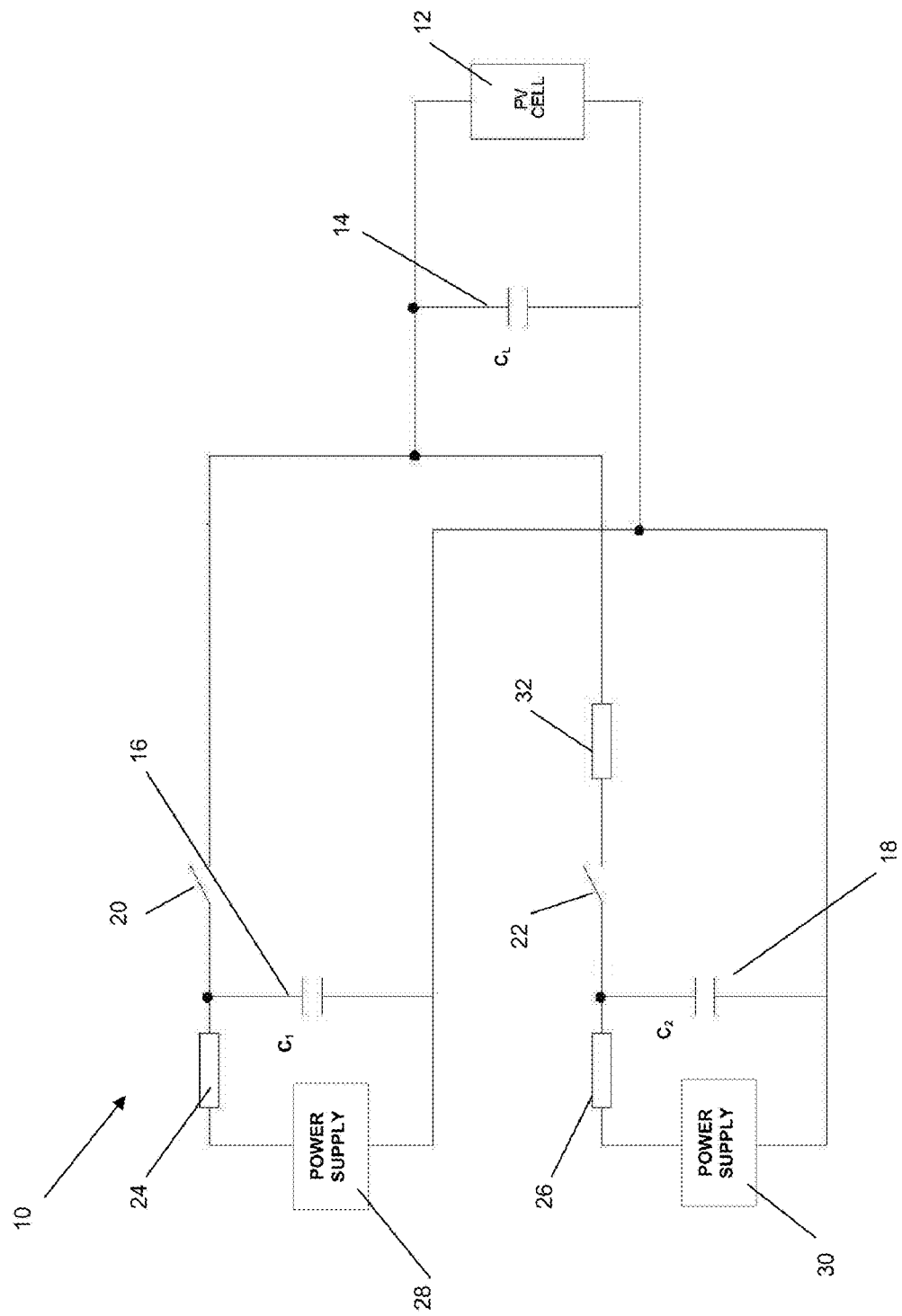
FIG. 2 is a drawing illustrating a circuit according to an embodiment of the present invention.

A single sweep circuit according to an embodiment of the present invention is illustrated in FIG. 1. As illustrated therein, circuit 10 preferably comprises photovoltaic ("PV") cell 12, or another device which desires to make use of the rapid sweeping load of the present invention, connected to load capacitor 14. Load capacitor 14 is preferably removably connected to capacitor 16 (C1) and/or capacitor 18 (C2) via switch 20 (S1) and switch 22 (S2). S1 and S2 are most preferably solid state switching devices, but can optionally be non-solid state switching devices. Elements 24 and 26 are preferably provided to limit current from power supplies 28 and 30 respectively. Elements 24 and 26 can comprise any component or combination thereof known to provide desirable results for limiting a flow of current, but most preferably comprise resistors and/or inductors. Element 32 is preferably provided so that the rise and/or fall time of the voltage across load capacitor 14 can be provided at a rate which is desirable to measure. For example, element 32 most preferably comprises a resistor or inductor of sufficient impedance such that the charging and/or discharging of load capacitor 14 occurs at a predetermined rate. As illustrated in FIG. 2, element 32 can optionally be provided on only one leg of the driving circuit.

Operation of the circuit of an embodiment of the present invention is preferably substantially as follows:
1) Connections are made and measurements are continuously or intermittently made of the voltage across and the current from PV cell 12 by a measurement device as shown in FIG. 1.
2) Capacitors C1 and C2, each of which most preferably has a capacitance of substantially more than that of CL, are charged to preset level 1 and preset level 2 respectively.
3) Switch S1 is fired and the voltage on CL charges to preset level 1, which is seen as the load for PV cell 12.
4) as PV cell 12 is pulsed with an external light source shown in FIG. 1 and CL holds the voltage at preset level 1.
5) Switch S1 is then preferably opened and S2 is closed, thus causing the CL to have a voltage which is swept from level 1 to level 2 in a time determined by CL and element 32.

Of course multiple other branches can be added to the circuit of the present invention, such that the voltage across CL is caused to go through any number of changes to any number of predetermined values.

Figure 4:
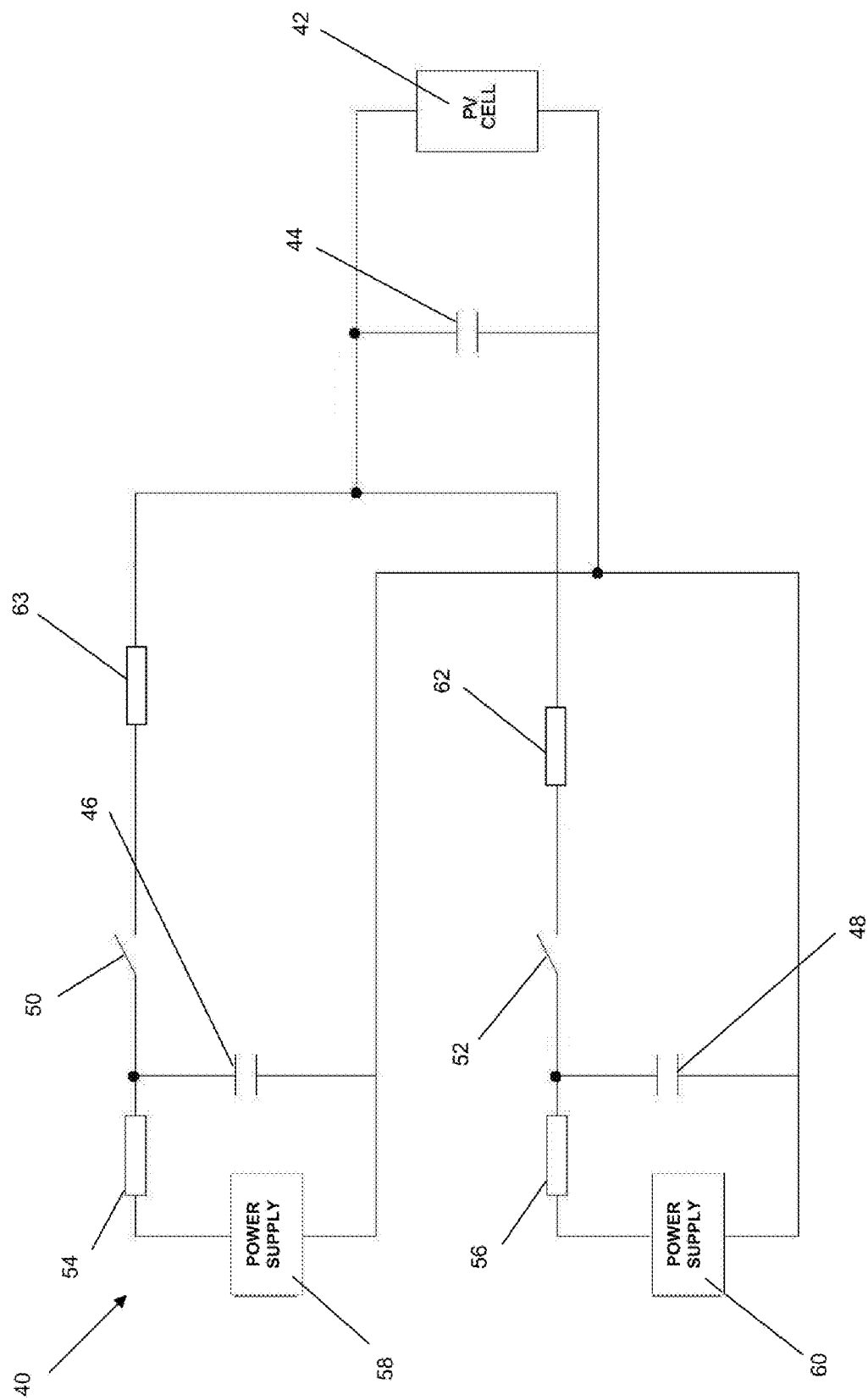
FIG. 4 is a drawing illustrating a preferred embodiment of a sweeping load circuit according to an embodiment of the present invention.

By using the switch geometry according to the teachings of the present invention, a load can be swept very quickly and accurately thereby allowing for a very consistent load voltage across a device under test, which can include a photovoltaic cell, and can even provide a positive or negative bias to reduce the effects of the connection and series resistance. Optionally, protection diodes can be placed in series with the photovoltaic cell capacitors 14 of FIGS. 1 and 2 or capacitor 44 of FIG. 4 and the photovoltaic cell to protect against reverse biasing if necessary. In one embodiment, empirical equations are preferably used to determine the values of initial charge voltage on capacitors 14, 16, 46, and 48 and to give the appropriate voltage sweep across the load. By doing this, the user only need supply the start and stop voltage and the charge voltage can be calculated from those values. In the embodiment of FIG. 4, resistors 62 and 63 can optionally comprise the same value or can comprise different values which allow different discharge slopes to be provided. In this embodiment, circuit 40 preferably comprises photovoltaic cell 42 connected in parallel to load capacitor 44. Circuit 40 also preferably comprises first and second power supplies 58 and 60 which are respectively connected to charge capacitors 46 and 48 through resistors 54 and 56. Switches 50 and 52 which are most preferably solid state switches are preferably used to discharge capacitors 46 and 48 through resistors 63 and 62 and into capacitor 44, which is therefore seen as a changing load by photo cell 42 or another device connected in its place. If the present invention is used to test a photovoltaic cell, preferably one or more flashes of a predetermined light source is flashed onto the cell during the course of time of the voltage sweep created by the present invention.

INDUSTRIAL APPLICABILITY

The invention is further illustrated by the following non-limiting example.

Example 1

Figure 3:
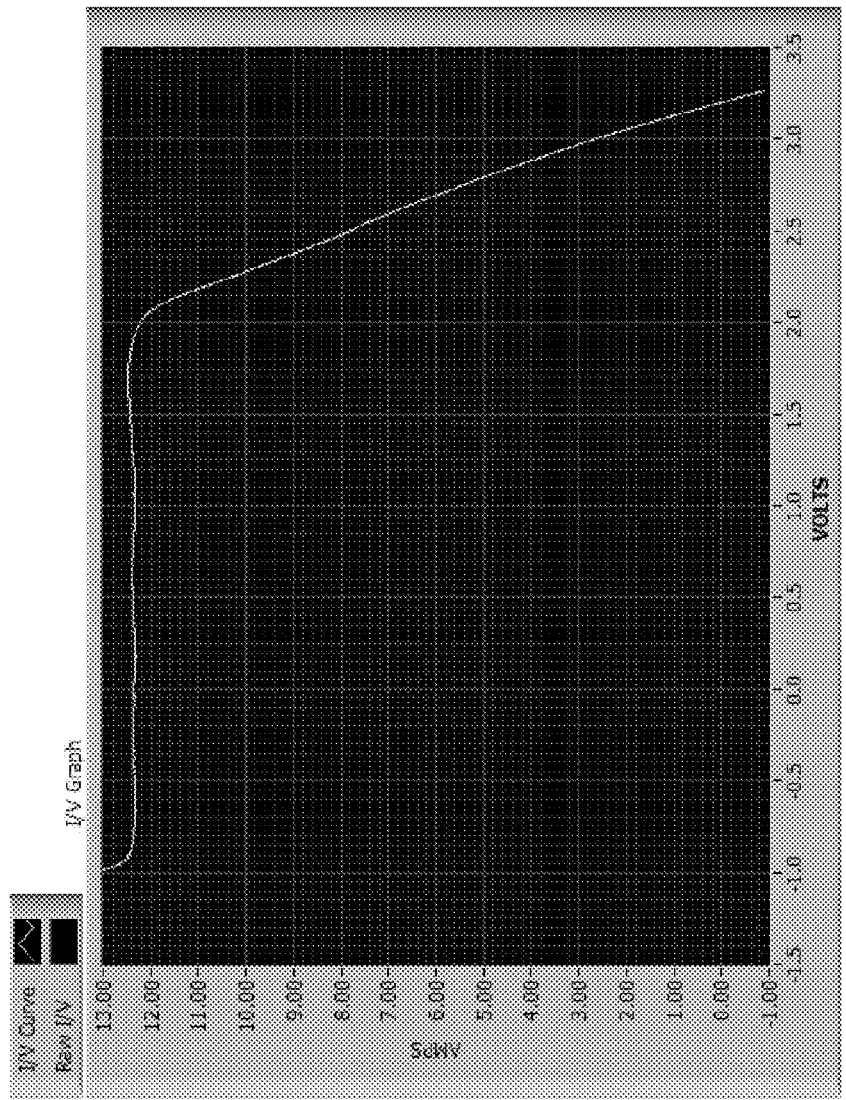
FIG. 3 is a computer-generated image illustrating a graph of a theoretical measurement of a simulated circuit according to an embodiment of the present invention.

A circuit testing program was used to simulate an embodiment of the present invention. FIG. 3 is a computer-generated graph depicting theoretical results obtained from the circuit simulation program. FIG. 4 illustrates one embodiment of the present invention for use in testing a photovoltaic cell under a sweeping load conditions. In this embodiment, capacitor 44 comprises a value of 5 millifarads, capacitors 46 and 48 comprise values of 2.4 millifarads each, resistors 54 and 56 comprise values of about 1,000 ohms each, resistor 63 comprises a value of about 4 ohms, and resistor 62 comprises a value of about 1 ohm.

Figure 5:
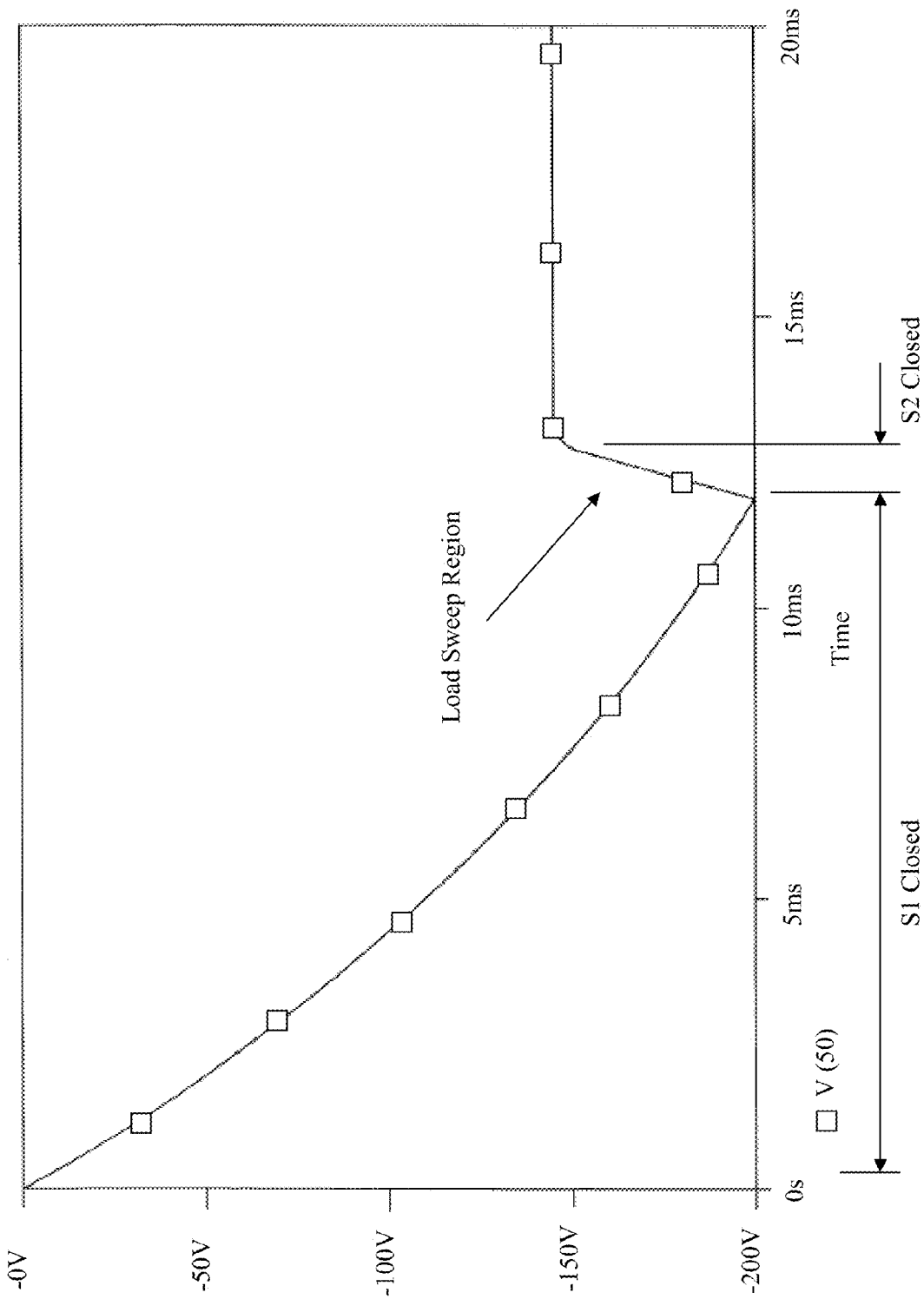
FIG. 5 is a computer-generated print out of results obtained by a circuit according to an embodiment of the present invention.

A circuit was constructed according to an embodiment of the present invention and measurements were obtained by a measurement device as shown in FIG. 4 which generated the graph of FIG. 5. In this embodiment, first switch 50 was closed and the voltage was charged to a preset value of −200V. The switch was then turned off and the second switch 52 was turned on, which swept the voltage back to −150 volts. In this case the charge voltage on power supply 58 was negative and the voltage on power supply 60 was positive. This swept the voltage from −200 volts to −150 volts. The sweep was almost linear. Capacitor 44 across load 42, which in this case was a photovoltaic cell, acted to sink the current generated from the solar cell under test when it was illuminated with a flash.

The preceding example can be repeated with similar success by substituting the generically or specifically described components and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A circuit for providing a rapid sweeping load comprising:
   first and second power supplies;
   a first capacitor coupled in a parallel configuration to said first power supply;
   a second capacitor coupled in a parallel configuration to said second power supply;
   a first current limiting component connecting said first power supply to said first capacitor;
   a second current limiting component connecting said second power supply to said second capacitor;
   a third capacitor, said third capacitor comprising a capacitance substantially smaller than each of said first and said second capacitors; and
   first and second switches, said switches respectively coupling said first and second capacitors to said third capacitor.

2. The circuit of claim 1 wherein at least one of said switches comprises a solid state switch.

3. The circuit of claim 1 wherein both of said switches comprises solid state switches.

4. The circuit of claim 1 wherein at least one of said first or second capacitors comprises a capacitance of less than about 10 millifarads.

5. The circuit of claim 4 wherein at least one of said first or second capacitors comprises a capacitance of less than about 5 millifarads.

6. The circuit of claim 1 wherein said third capacitor comprises a capacitance which is greater than that of said first or said second capacitors.

7. The circuit of claim 1 further comprising a third current limiting component.

8. The circuit of claim 7 wherein said third current limiting component comprises a current limiting resistor.

9. The circuit of claim 7 wherein said third current limiting component comprises an inductor.

10. The circuit of claim 7 wherein said third current limiting component is electrically connected between the load capacitor and the first and second charged capacitors.

11. A method for testing a photovoltaic cell by causing a sweeping load across the photovoltaic cell comprising:
    connecting the photovoltaic cell to a sweeping load testing test circuit comprising:
       connecting a load capacitor to a first charged capacitor;
       disconnecting the load capacitor from the first capacitor;
       connecting the load capacitor to a second charged capacitor;
    applying a light source to the photovoltaic cell; and
    testing the photovoltaic cell by obtaining one or more test measurements indicative of the photovoltaic cell.

12. The method of claim 11 further comprising disconnecting the load capacitor from the second charged capacitor.

13. The method of claim 11 wherein applying a light source comprises applying a pulsed light source.

14. The method of claim 11 wherein the one or more test measurements comprise a voltage measurement.

15. The method of claim 11 wherein the one or more test measurements comprise a current measurement.

16. The method of claim 11 wherein disconnecting the load capacitor from the first capacitor and connecting the load capacitor to a second charged capacitor causes a sweeping voltage across the photovoltaic cell.

17. The method of claim 15 wherein the one or more test measurements are obtained during the time in which the sweeping voltage across the photovoltaic cell occurs.

18. The method of claim 16 wherein the test measurements are obtained during a time period of from about 10 microseconds to about 100 milliseconds.

19. The method of claim 17 wherein the test measurements are obtained during a time period of from about 10 microseconds to about 10 milliseconds.

20. The method of claim 11 wherein connecting a photovoltaic cell comprises connecting a photovoltaic cell in a parallel configuration with the load capacitor.

21. The method of claim 11 wherein connecting a load capacitor to a first charged capacitor comprises connecting a load capacitor to a first charged capacitor which has substantially larger capacitance than the load capacitor.

22. The method of claim 11 wherein connecting a load capacitor to a first charged capacitor comprises connecting a load capacitor to a second charged capacitor which has larger capacitance than the load capacitor.

* * * * *